United States Patent
Heyman

[11] 3,726,125
[45] Apr. 10, 1973

[54] METHOD AND APPARATUS FOR MEASURING SHRINKAGE

[75] Inventor: Albert A. Heyman, Baltimore, Md.

[73] Assignee: Maryland Cup Corporation, Owings Mills, Md.

[22] Filed: July 7, 1971

[21] Appl. No.: 160,330

[52] U.S. Cl. .................................... 73/15 R, 73/159
[51] Int. Cl. ............................................. G01n 25/00
[58] Field of Search ............... 73/15, 159; 425/290, 425/404

[56] References Cited

UNITED STATES PATENTS

2,968,177  1/1961  Mann et al. ..................... 73/159 X
3,494,172  2/1970  Juve et al. ...................... 73/15

Primary Examiner—James J. Gill
Assistant Examiner—Herbert Goldstein
Attorney—Birch and Birch

[57] ABSTRACT

Method and apparatus for testing sample discs cut from extruded sheets of polystyrene and the like to determine percentage of shrinkage. Sample discs are cut from the parent extruded sheet, each sample is identified as to location and direction of extrusion, then heated in the test apparatus at the expected temperature which products are to be formed from the parent sheet and the shrinkage in the extrusion direction is then measured.

12 Claims, 11 Drawing Figures

INVENTOR.
ALBERT A. HEYMAN,
BY Birch and Birch
ATTORNEYS

METHOD AND APPARATUS FOR MEASURING SHRINKAGE

BACKGROUND OF THE INVENTION

This invention relates to a method and apparatus for quality control of such as lid products, cups, plates and various other products, formed from extruded plastic sheets of polystyrene and like material, wherein the styrene molecules are drawn or oriented in the direction of extrusion by means of heat and forming force.

For example, if a sample from an area of the extruded plastic sheet, such as polystyrene or like material, is reheated after orientation, as when heat processed in plastic lid forming machinery, the styrene molecules will partially return to their original "criss-cross" positions. The degree of return or percent of shrinkage is measured by the present method and apparatus, and it has been discovered that the lower the percent of shrinkage of orientation by a sample reheating test, the better the quality of the lids produced by the lid forming machine.

The object of this invention is to provide a means for easily and accurately determining the percentage of orientation of an extruded sheet of polystyrene or similar material.

A further object is to provide means for horizontally locking samples taken from an extruded sheet after shrinkage, subjecting such samples to a predetermined temperature, high enough to release the strains that were built into the sheet during extrusion orientation, and after cooling to measure the percentage and direction of shrinkage due to the orientation that was built into the sheet.

A further object is to provide means which enable the operator to maintain the heat at close tolerance, ± 003°F, where needed, over an appreciable time (10 minutes or more).

Another object is to provide an enclosed sample confining space of predetermined height where the sample discs taken from an extruded sheet being tested may be confined without clamping in any manner whatsoever, to thereby permit the sample discs being tested to change into such shape and pattern as the previously built in strains of orientation determine.

A further object is to provide a sample testing space formed between nested cell members each with sufficient apertures and perforations to allow a free flow of oil to engulf the discs confined in the space between the cells, yet have these perforations minute enough to prevent the expanding disc material from forcing its way into these perforations, whereby interference with free flow of the material when in its plastic state is prevented.

A further object is to provide novel adjustable means whereby the sample confining space may be increased or diminished as required.

A further object is to provide novel means whereby the space between the cells is effectively maintained throughout the heating operation, thus ensuring a true test of the degree of orientation after shrinkage.

These and further objects will become clear from the following description of the method and apparatus which I have developed and built and which has proven successful in its application to the present plastic lid and cup forming operation.

In the drawings:

FIG. 4 is an assembled cross-section of an oil reservoir with insulated side walls and stepped support portions at the top of each insulated wall to adjustably support the central sample disc testing cells;

FIG. 11 is an illustration of the orientation sample discs after shrinkage showing the same marked for left, left center, center, right center and right as die cut specimens originally cut to 1.750 inches in diameter.

Figure 1:
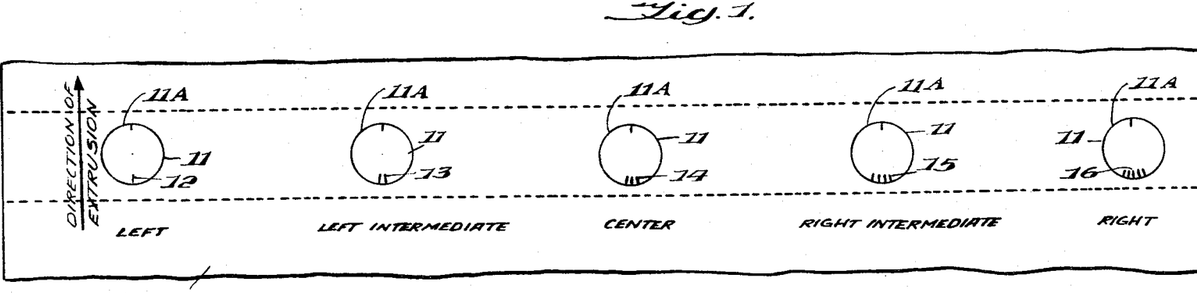
FIG. 1 is a fragmentary top plan view of a sheet of plastic with legends to indicate the direction of travel of the sheet from the extruder to the packing table with coded sample discs marked across the parent sheet before removal for testing by reheating.

Now with reference to the drawings and first with reference to FIG. 1 there is shown a parent plastic sheet 10 of material, such as polystyrene. This sheet is shown in the process of being pulled from between the pull rolls, not shown, at the start of operation of a lid forming machine. A mark indicative of extruder direction with the sides of the sheet indicated as left or right, date and machine number may be placed on the sheets and the samples 11 are cut out from the extruded parent sheet 10 and marked with code 12, 13, 14, 15 and 16. These code marks or dashes identify the location or area of the portion of the sheet from which each sample 11 is cut, so as to later after cooling and then heat testing with the apparatus, shown in assembled FIG. 4, permit calculation of the percent of shrinkage upon reheating in the test apparatus.

The samples 11 cut from the parent sheet 10 are each code marked, for example, by dashes 1 through 5 in number with a forward extrusion dash 11A in the direction of the packing table from the extruding rollers of any lid forming machine, see FIG. 1. These sample discs 11 are placed in the testing apparatus, hereinafter described, thus marked and the test temperature is brought up to the simulated heat of lid forming machinery.

This sample testing apparatus comprises an oil pot 20 of a predetermined practical volume and size and is enclosed by two annular spaced walls 21 and 22 filled with suitable insulation material 24. These insulated walls assist in the maintenance of a substantially uniform temperature of the oil 26 in the oil reservoir or pot 20. The oil pot 20 may be provided with exterior handle means 27 positioned diametrically.

Figure 10:
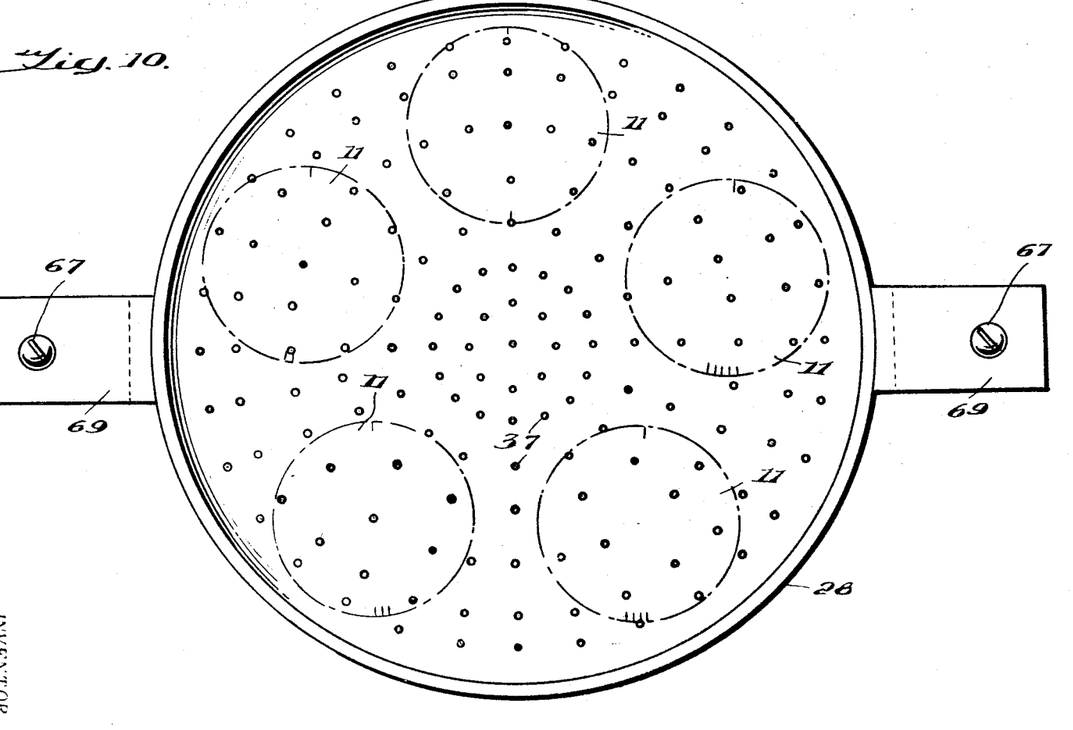
FIG. 10 is a top plan view showing an approximate arrangement of the sample disc ready for test.

The oil is maintained at a predetermined desirable level in the pot 20 to provide for immersion of the lower portion of nested sample holding cell members. These members comprise an outer cell 28 within which is nested an inner cell 30. The bottom 31 of the inner cell is formed with an annular depending peripheral flange 33, see FIGS. 4, 5 and 6, to provide a space 35 between the bottom inner surface 36 of the outer cell 28 and the bottom exterior surface 31 of the inner cell 30 to confine the sample discs, see FIG. 10, for testing for any orientation shrinkage that may be caused by reheating them in the heated oil.

Figure 9:
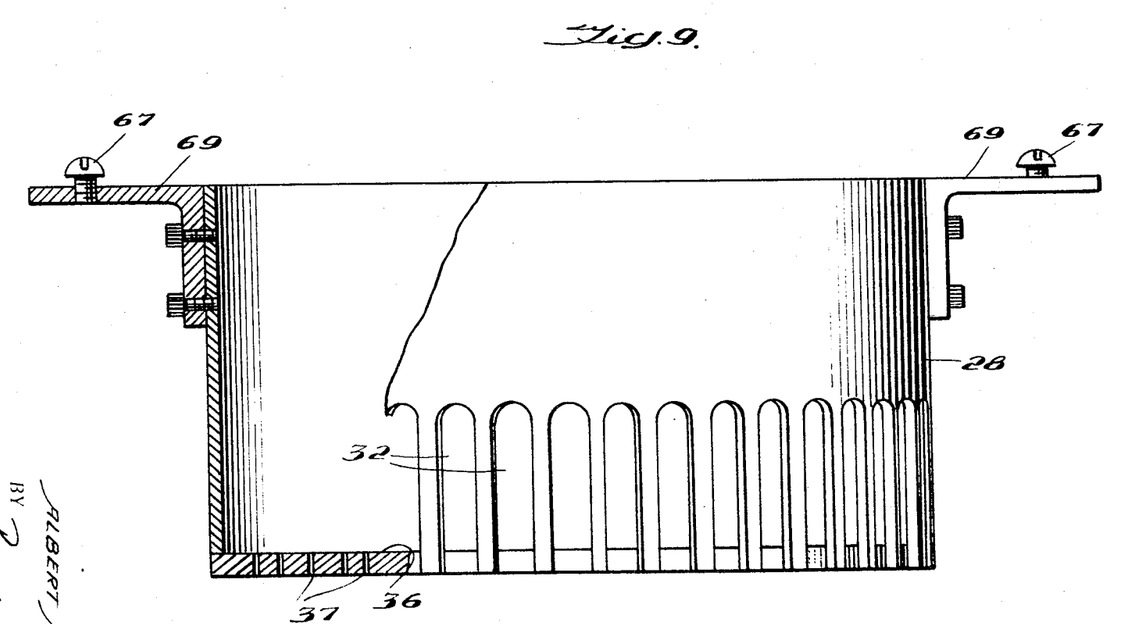
FIG. 9 is a cross-section view of the sample confining outer cell illustrating the oil flow openings.

This space 35 is for freely confining the plastic discs 11 taken from the parent polystyrene sheet after extrusion without holding or clamping. The spaced bottom surfaces 36 and 31 of the outer and inner cells 28 and 30 are each formed with openings 37 and 38 their respective vertical side wall may be formed with slots 32 and 39, see FIGS. 5 and 9, to permit hot oil to freely flow into contact with the code identified samples 11 to be tested and are small enough so as not to allow the reheated samples to penetrate and block free flow of the sample testing oil 26 therethrough. Penetration of the sample material into the oil holes would block the free flow of the expanding and contracting plastic material.

The oil reservoir is heated by any form of suitable heater, such as 40 shown positioned below the same and may include a heat control knob 41, see FIGS. 3 and 4.

Figure 3:
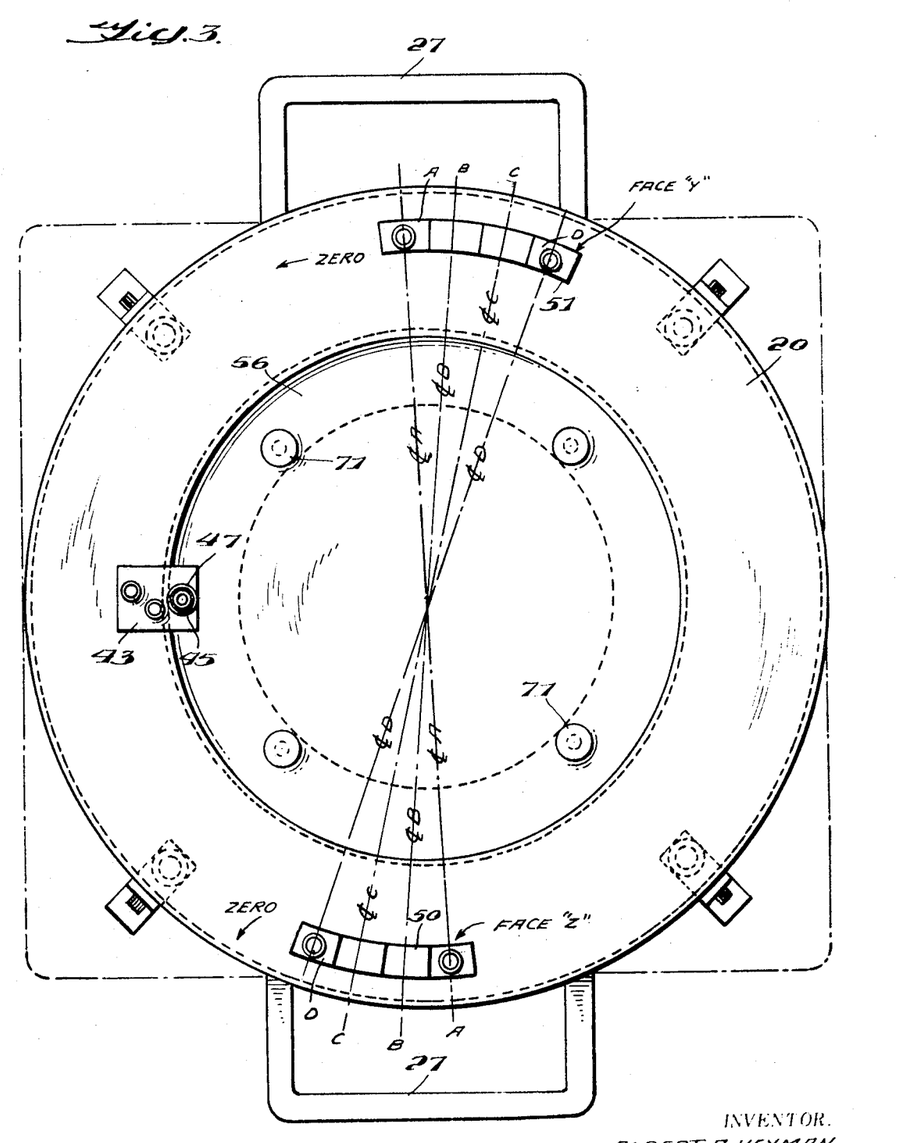
FIG. 3 is a top plan view of FIG. 2.

As shown in FIG. 3, arranged at one side of the oil reservoir 20 is a bracket 43 and a depending oil pot thermometer holder tube 45, see FIG. 4. A thermometer 47 may be inserted in the tube, to thereby determine the precise moment at which immersion of the samples to be tested should take place. This immersion should be made, for example, at 340°F. The 40° compensates for heat loss to inner and outer cells at the moment of immersion.

Figure 2:
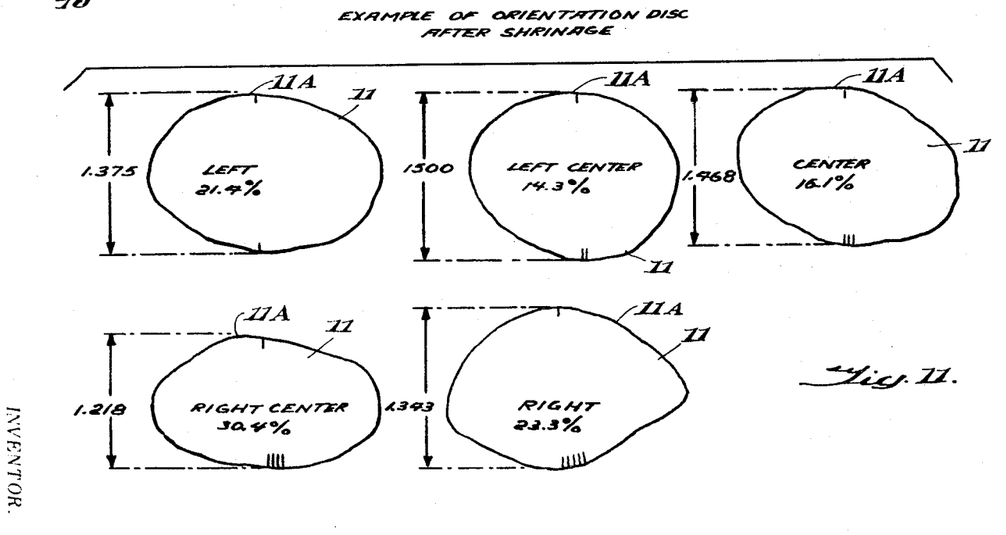
FIG. 2 is an elevation view of a side of the oil reservoir stepped supports and a bracket for a thermometer holder tube with the inner cells removed.

To provide for regulated immersion of the samples between the spaced bottom surfaces 36 and 31 of the outer and inner cells 28 and 30, the top of the insulated oil pot walls have securely mounted thereon vertically stepped support segments 50 and 51, see FIGS. 2, 3 and 4. These support steps are disposed diametrically opposite one with respect to the other and provide means for controlling the immersion of the outer and inner cells with the samples on a precision basis. The deeper in to the oil the immersed parts with the samples are set, the hotter they may become. Conversely the higher the step of the supports 50 and 51 on which the handles 53 and 54 of the cell supports hereinafter described are placed, the less intense is the heating and the lower is the temperature at the sample enclosing space 35 between the spaced bottom surfaces of the nested cell members. See FIG. 4 for illustration of the space 35 and the handles.

Figure 8:
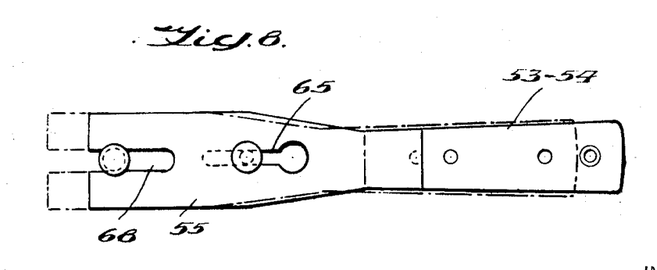
FIG. 8 is a detail view of one of the supporting handles and the spring steel portion thereof.

The handles 53 and 54 are further described in detail, hereinafter in connection with FIG. 8.

Figure 5:
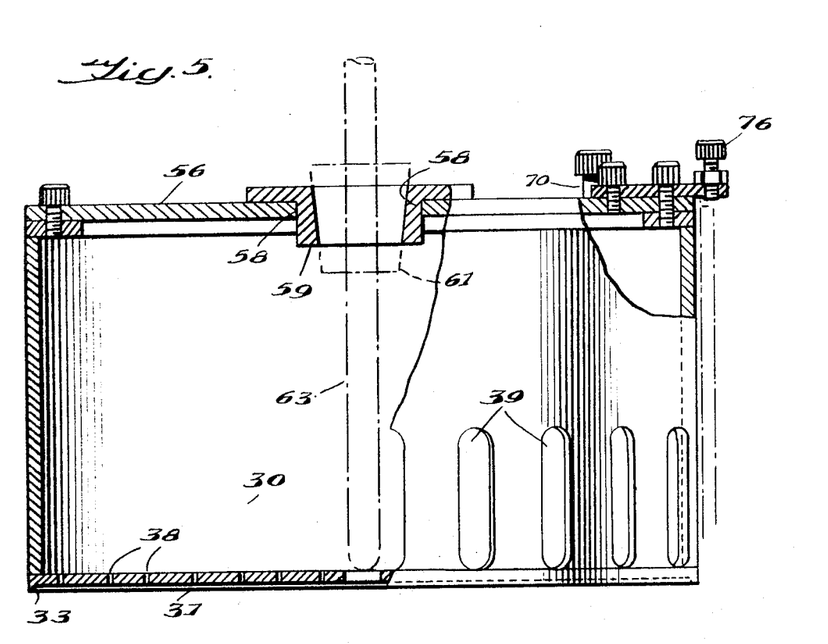
FIG. 5 is a cross-section view of the inner sample confining unit with a thermometer and support adapted to be lowered into the oil heater pot portion of the apparatus.
Figure 6:
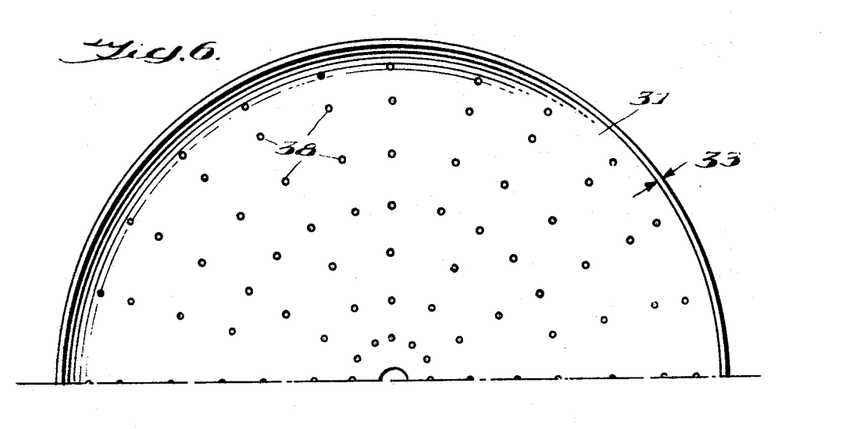
FIG. 6 is a bottom view of the bottom sample confining plate.

The samples to be tested are confined in the space 35, but are not clamped nor restricted in any manner due to the depending flange or annular ridge 33 around the peripheral edge of the exterior bottom surface 31 of the inner cell 30, see FIGS. 4, 5 and 6.

The inner cell includes a top cover 56 centrally formed with an opening 58 for a bushing 59 with a tapered bore to receive a mating tapered plug 61, which supports a thermometer 63. This thermometer projects downward into the inner cell 30 and enters space 35 and may rest on inner bottom surface of outer cell 28, and enables the operator to determine the exact moment when the oil bath 26 in contact with the sample discs 11 has reached the required test temperature, for example 305°F. A plus or minus temperature of 5° and closer can be held by the operator by means of the multiple stepped segments 50 and 51, see FIG. 4. However, as shown, the tip end of the thermometer may preferably not be extended to the bottom surface of cell 28 to provide for testing of a single large sample taken from a selected part of the sheet. Hence the central opening at the center of surface 31 is not needed when the thermometer tip is not extended into contact with the surface of cell 28.

To hold the space 35 to, for example, ± .001 of an inch tolerance throughout the process of immersion, a clamp is provided in the form of elongated spring steel sections 55 for each of the handles 53 and 54, previously mentioned. These steel sections 55 are each formed with cooperating fastener openings, such as an aligned button hold slot 65 and a continuous end slot 68, see FIG. 8.

These handles at the button hole slot 65 are arranged to fasten with a button head screw 67 carried by a bracket 69 of the outer cell 28 and fit in the hole portion of button hole slot 65, while the continuous end slot 68 of the respective handles engages around the shank 70 of a shoulder bolt 71 which is attached to the cover 56 of the inner cell 30, see FIG. 4.

By slidably engaging the continuous open end slot 68 around the shoulder bolt 71, which is attached to inner cell 30, and bringing button hole 65 into position directly over the button head screw 67 carried by the outer cell 28 and pulling the handles 53 and 54 outwardly, the cells become effectively locked and are held suspended by the handles 53 and 54. Thus the space 35 remains constant throughout the manipulation of the unit, see FIG. 4. This space 35, as shown in FIGS. 5 and 7, may be adjusted by thrust means such as screws 75, 76 and 77 shown bearing on the rim of the outer cell wall, to thereby raise or lower the inner cell, for example, by as much as 5 – 6 thousandths of an inch or percentage wise 30 to 40 percent of the thickness of the extruded sheet.

The combined unit of outer cell 28 and inner cell 30, space lock handles 53 and 54 and sample discs 11 are now lowered into the oil pot 20, immersing the samples in the hot oil bath 26. Oil flows freely all around, on the top and on the bottom of the sample discs, evenly heating them.

The entire unit is held suspended by the handles 53 and 54, which are momentarily set to rest on top of the oil pot 20 at the selected steps 50 and 51. As the inner cell thermometer 63 rises in temperature to, for example, about 305°F, the operator lifts the unit up by the handles 53 and 54 and places the handles upon a next higher step of stepped supports 50 and 51. This causes the temperature of the thermometer 63 to drop and when, on its way down, it reaches 302°F, the operator once again lifts the cell units by the handles off the higher step of respective supports 50 and 51 and places it on a lower step. The operator does this several times, until the heating becomes standardized at 305°F. These steps are shown in FIG. 3 as A, B, C, and D from a zero point at the cover 20 of the outer cell.

Figure 7:
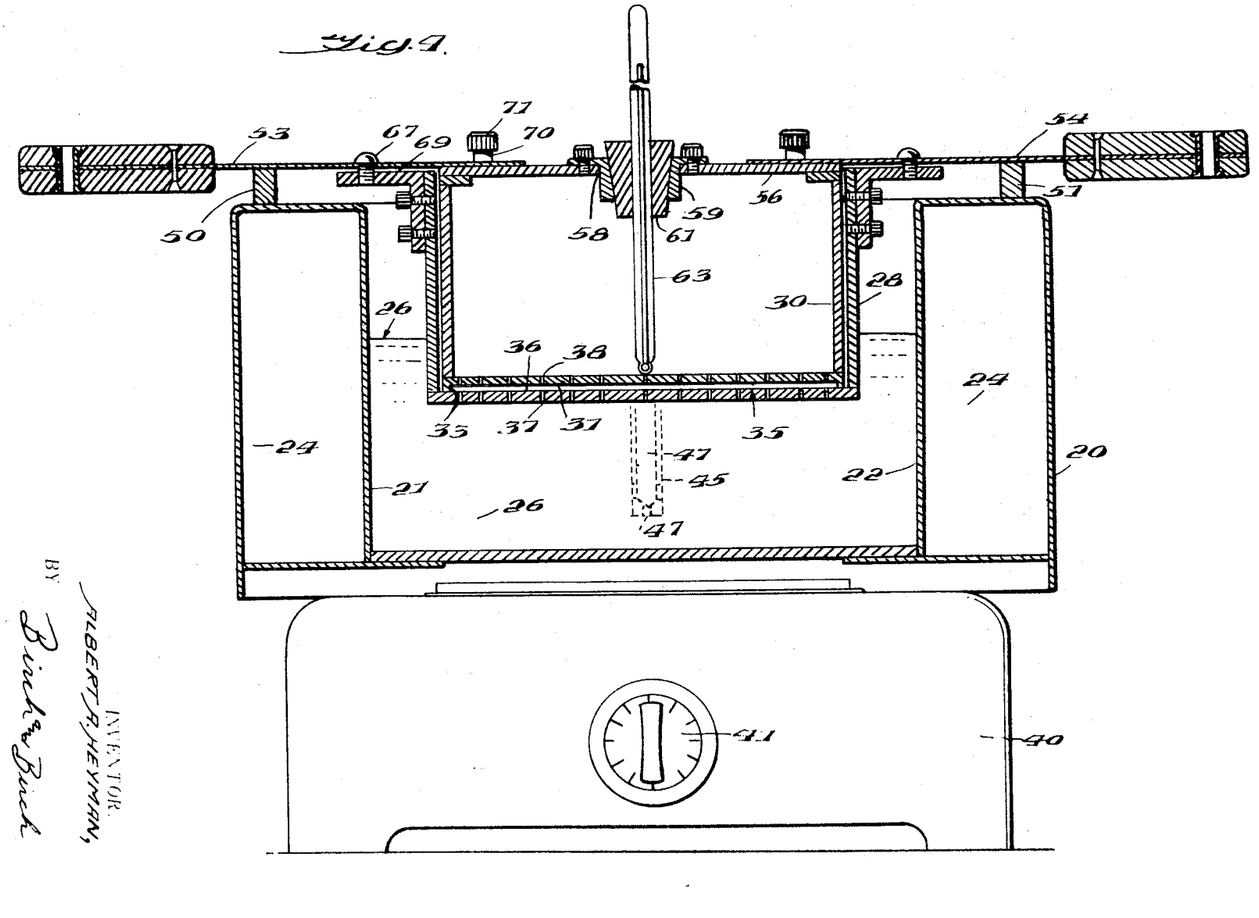
FIG. 7 is a top plan view of the cover plate for the inner cell.

Thus with this test apparatus it is feasible to hold the heat at 305°F ± 3° and further the space 35 between cells 28 and 30 may be adjustable by set screw means 75, 76 and 77, see FIGS. 5 and 7. Also, cover plate 56 of inner cell 30 is removable for cleaning of the inner cell.

After testing in the apparatus, shown assembled in FIG. 4, the reheating to which the samples are likely to be subjected to in different machines, such as machine numbers 2 through 4 may be documented. For example, the cut samples are spread out from left to right in the direction of extrusion across the parent sheet in a machine from which the samples are taken, see FIGS. 1 and 11. For example, such samples are cut to a predetermined diameter, such as 1.750 inches in diameter, so a measure of the width of shrunken specimens in the direction of extrusion may be calculated for percentage of shrinkage using the following formula:

% Shrinkage of

Orientation = 100% − [(width)(100)/1.750]

Left 100% − [(1.375)(100)/1.750] = 21.4%

Left Center 100% − [(1.500)(100)/1.750] = 14.3%

Center 100% − [(1.468)(100)/1.750] = 16.1%

Right Center 100% − [(1.218)(100)/1.750] = 30.4%

Right 100% − [(1.343)(100)/1.750] = 23.3%

Thus it is noted from such calculations that the left center and center samples come from the lowest shrinkage area of the extruded parent sheet and this area of low shrinkage will produce the highest quality lid material for the lid machines. Accordingly, the low shrinkage materials may be selected for the lid forming operation, or the high shrinkage areas, once determined, may be corrected and all lids are acceptable.

Without further description it is believed the method and apparatus has been described in sufficient detail for others skilled in the art to practice the present invention. For a definition of the scope or limits of the invention, reference should be had to the appended claims.

I claim:

1. The method of determining the percentage of shrinkage or orientation when reheating of an extruded plastic sheet extruded at a first extruding heat to form the sheet, comprising the steps of cutting samples of a predetermined diameter from the parent extruded sheet of plastic, marking each sample with code indications to identify the location of each sample across the parent sheet from which the samples are cut, marking the samples to indicate the direction of extrusion, reheating said samples in a test apparatus to temperatures at which said parent sheet is to be made into products, and measuring the shrinkage of said samples in the said direction of extrusion to determine the percentage of shrinkage of said samples to predict the percentage of shrinkage of said parent sheet at like temperatures.

2. The method of claim 1 including the further step of correlating the percentage of shrinkage of said samples with the respective locations across said parent sheet from whence they came to provide a profile of the percentage of shrinkage across said sheet at said like temperatures.

3. Apparatus for testing the percent shrinkage of orientation of extruded plastic sheet of lid forming machines, from which discs of the extruded plastic sheet to be tested are cut transversely from left to right thereof, comprising:
   1. a pot partially filled with oil to be heated;
   2. an inner cell formed with oil flow openings;
   3. an outer cell likewise formed with oil flow openings;
      a. said cells being nested one within the other;
   4. spacer means between the bottom portions of the cells to provide a test space for a plurality of discs to be tested;
   5. means to hold the cells nested together with handles to provide for lifting or lowering said cells in the said pot;
   6. a first temperature indicator for determining the temperature of the oil in the pot;
   7. a bracket secured to the wall of the said pot for said first temperature indicator;
   8. a cover over said inner cell;
   9. a second temperature indicator concentrically mounted in an opening in the cell cover, said cells when assembled in nested relation confining sample discs between their spaced bottoms; and
   10. cell support means diametrically positioned on the top rim of the pot wall for said means with handles to hold the cells and support the cells at predetermined levels of immersion in the oil in the pot in accordance with the temperature indications of said second temperature indicating means after a predetermined time.

4. Apparatus for testing as defined in claim 3, wherein said pot is formed with spaced insulated walls.

5. Apparatus for testing as defined in claim 3, wherein said flow openings in said cells are formed in the bottom and side walls of said cells.

6. Apparatus for testing as defined in claim 3, wherein said spacer means comprises an annular peripheral flange to maintain the respective bottom surfaces of said nested cells in spaced apart relation.

7. Apparatus for testing as defined in claim 6, wherein said flange is formed from the exterior peripheral surface of the bottom surface of said inner cell.

8. Apparatus for testing as defined in claim 6, wherein the space between the bottom of the inner and outer nested cells is adjustable, said adjustment being provided by vertically movable thrust means carried by means on the rim of the inner cell, said thrust means bearing on the rim of the wall of the outer cell to provide thrust to raise and lower the inner cell for predetermined spacing in accordance with the thickness of an extruded sheet being tested.

9. Apparatus for testing as defined in claim 8, wherein said thrust means are threaded screw means mounted in a cover plate over said inner cell.

10. Apparatus for testing as defined in claim 3, wherein said means to hold the nested cells comprise handles with elongated sections with fastener cooperating openings formed therein, coacting to mate with fasteners carried by each upper rim of each of said nested cells.

11. Apparatus for testing as defined in claim 3, wherein said second temperature indicator is an elongated tubular thermometer and depends concentrically into the interior of the inner cell.

12. Apparatus for testing as defined in claim 3, wherein said support means on the top of said pot walls comprise step portions, said portions serving to graduately support the handles of the said means for holding said nested cells.

* * * * *